United States Patent [19]

Eshita et al.

[11] Patent Number: 5,514,355
[45] Date of Patent: May 7, 1996

[54] METHOD FOR PURIFYING AN OXYGEN-RICH EXHAUST GAS

[75] Inventors: Akinori Eshita; Senshi Kasahara, both of Shinnanoyo, Japan

[73] Assignee: Tosoh Corporation, Shinnanyo, Japan

[21] Appl. No.: 190,583

[22] Filed: Feb. 2, 1994

Related U.S. Application Data

[63] Continuation of Ser. No. 730,469, Jul. 16, 1991, abandoned.

[30] Foreign Application Priority Data

| | | | |
|---|---|---|---|
| Jul. 19, 1990 | [JP] | Japan | 2-189342 |
| Dec. 11, 1990 | [JP] | Japan | 2-409704 |
| Dec. 20, 1990 | [JP] | Japan | 2-411788 |

[51] Int. Cl.$^6$ .................... B01D 53/56; B01D 53/72; B01D 53/94
[52] U.S. Cl. .................... 423/239.2; 423/245.3; 423/212; 423/213.2; 423/213.5; 60/274
[58] Field of Search .................... 423/212 C, 213.2, 423/213.5, 235, 245.3, 247, 239.2; 60/274, 299

[56] References Cited

U.S. PATENT DOCUMENTS

| | | | |
|---|---|---|---|
| 3,600,142 | 8/1971 | Fessler | 423/210 C |
| 3,826,810 | 7/1974 | Lawson | 423/212 C |
| 4,127,510 | 11/1978 | Harrison et al. | 252/462 |
| 4,157,375 | 6/1979 | Brown et al. | 423/239 |
| 4,297,328 | 10/1981 | Ritscher et al. | 423/213.2 |
| 4,793,980 | 12/1988 | Torobin | 423/213.5 |
| 5,010,051 | 4/1991 | Rudy | 502/304 |
| 5,149,512 | 9/1992 | Li et al. | 423/239 |
| 5,185,305 | 2/1993 | Subramanian | 502/65 |
| 5,206,196 | 4/1993 | Nakano et al. | 502/73 |
| 5,208,198 | 5/1993 | Nakano et al. | 502/74 |
| 5,208,205 | 5/1993 | Subramanian | 502/333 |
| 5,223,236 | 6/1993 | Inoue et al. | 423/213.2 |
| 5,270,024 | 12/1993 | Kasahara et al. | 423/213.2 |
| 5,338,715 | 8/1994 | Iida et al. | 502/64 |
| 5,374,409 | 12/1994 | Kasahara et al. | 423/213.2 |
| 5,382,416 | 1/1995 | Nakano et al. | 423/213.2 |
| 5,407,651 | 4/1995 | Kawai | 423/213.2 |
| 5,433,933 | 7/1995 | Eshita et al. | 423/213.2 |
| 5,451,385 | 9/1995 | Hansel et al. | 423/213.5 |

FOREIGN PATENT DOCUMENTS

| | | | |
|---|---|---|---|
| 20799 | 1/1981 | European Pat. Off. . | |
| 362966 | 4/1990 | European Pat. Off. . | |
| 0362966 | 4/1990 | European Pat. Off. | 423/239.2 |
| 373665 | 6/1990 | European Pat. Off. . | |
| 415410 | 3/1991 | European Pat. Off. . | |
| 0445816 | 9/1991 | European Pat. Off. | 423/239.2 |
| 2174180 | 10/1973 | France . | |
| 4-83516 | 3/1992 | Japan | 423/239.2 |
| 4284826 | 10/1992 | Japan | 423/239.2 |
| 5-23546 | 2/1993 | Japan | 423/239.6 |

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

A catalyst, for purifying an exhaust gas, is a zeolite catalyst for removing nitrogen oxides, carbon monoxide and hydrocarbons from an oxygen-rich exhaust gas containing the nitrogen oxides, carbon monoxide and hydrocarbons, wherein the zeolite has an $SiO_2/Al_2O_3$ molar ratio of 10 or more and contains nickel, or wherein the zeolite has an $SiO_2/Al_2O_3$ molar ratio of 15 or more, and contains nickel and a rare earth metal or an alkaline earth metal.

14 Claims, No Drawings

METHOD FOR PURIFYING AN OXYGEN-RICH EXHAUST GAS

BACKGROUND OF THE INVENTION

1. Field of the Invention

The present invention relates to a catalyst for purifying an exhaust gas for removing nitrogen oxides, carbon monoxide and hydrocarbons contained in the exhaust gas discharged from an internal combustion engine such as an automobile engine. More specifically, it relates to a catalyst for purifying an oxygen-rich combustion exhaust gas.

2. Description of the Related Art

Nitrogen oxides, carbon monoxide and hydrocarbons, as detrimental materials in an exhaust gas discharged from an internal combustion engine, are conventionally removed by a ternary catalyst comprising Pt, Rh, Pd, and the like, supported on a support. Nevertheless, effective catalysts for the removal of nitrogen oxides in the exhaust gas of a Diesel engine were not available, because the exhaust gas contains large quantities of oxygen, and accordingly, an exhaust gas purification using a catalyst was not possible.

A lean fuel combustion (i.e., combustion at a relatively low fuel/oxygen ratio) has become necessary for recent gasoline engines, to obtain a low fuel consumption and reduce the quantity of the carbonic acid gas emitted, but since the exhaust gas of this lean combustion gasoline engine is oxygen-rich, the conventional ternary catalysts as described above cannot be employed, and thus a practical method of removing these detrimental components has not yet been discovered.

As a method of removing, in particular, nitrogen oxides in such an oxygen-rich exhaust gas, there are known a method which adds a reducing agent such as ammonia and a method which adsorbs and removes the nitrogen oxides by using an alkali, and so forth, but these methods are not suitable for use in an automobile, which is a moving source of the generation of an exhaust gas, and the application thereof is limited.

It is known in the art that a zeolite catalyst prepared by an ion-exchange with a transition metal can be used in the same way as the conventional ternary catalyst. Japanese Unexamined Patent Publication (Kokai) No. 1-130735, for example, proposes a catalyst which can selectively reduce the nitrogen oxides even in an oxygen-rich exhaust gas containing a trace amount of a reducing agent such as unburnt carbon monoxide and hydrocarbons.

Nevertheless, the catalyst proposed in this prior art reference undergoes a remarkable lowering of its activity in the course of long time use at a high temperature, and needs much improvement from the aspects of durability and catalyst performance. Accordingly, this catalyst has not been put to practical use.

SUMMARY OF THE INVENTION

Accordingly, the objects of the present invention are to eliminate the above-mentioned disadvantages of the prior art and to provide a catalyst which can simultaneously remove nitrogen oxides, carbon monoxide and hydrocarbons from an oxygen-rich exhaust gas discharged from an internal combustion engine such as an automobile engine, and which has less thermal gradation but a high durability, and a method of using this catalyst.

Other objects and advantages of the present invention will be apparent from the following description.

In accordance with the present invention, there is provided a catalyst for purifying an exhaust gas by removing nitrogen oxides, carbon monoxide and hydrocarbons from an oxygen-rich exhaust gas containing the same comprising a zeolite having an $SiO_2/Al_2O_3$ molar ratio of at least 10 and nickel.

In accordance with the present invention, there is also provided a catalyst for purifying an exhaust gas comprising a zeolite having an $SiO_2/Al_2O_3$ molar ratio of at least 15, nickel, and a rare earth metal or an alkaline earth metal.

In accordance with the present invention, there is further provided a method of removing nitrogen oxides, carbon monoxide and hydrocarbons from an oxygen-rich combustion exhaust gas containing the same, by bringing the oxygen-rich combustion exhaust gas into contact with the exhaust purification catalysts mentioned above.

DESCRIPTION OF THE PREFERRED EMBODIMENTS

The present invention will be now explained in detail.

The zeolite described above generally has the composition expressed by the formula below:

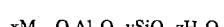

$$xM_{2/n}O \cdot Al_2O_3 \cdot ySiO_2 \cdot zH_2O$$

(where n is the valence of a cation M, x is a number of from 0.8 to 2, y is a number of at least 2, and z is a number of at least 0).

The zeolite usable in the present invention essentially must have an $SiO_2/Al_2O_3$ molar ratio of at least 10. The upper limit of the $SiO_2/Al_2O_3$ molar ratio is not particularly limited, but when the $SiO_2/Al_2O_3$ molar ratio is less than 10, the zeolite per se has a low heat resistance and low durability, and thus the catalyst does not have a sufficient heat resistance and durability. Generally, zeolites having an $SiO_2/Al_2O_3$ molar ratio of from about 10 to about 1,000 are employed.

Where a second metal component other than nickel is contained in the zeolite, a zeolite having a lower limit of the $SiO_2/Al_2O_3$ molar ratio of at least 15 is employed.

The zeolite usable in the catalyst of the present invention may be a natural zeolite or synthetic zeolite, and the method used for the production of these zeolites is not particularly limited. Typically, zeolites such as mordenite, ferrierite, ZSM-5, ZSM-11, ZSM-12, ZSM-20, etc., can be used, and these zeolites can be used as the catalyst of the present invention either as is or after conversion to an $NH_4$ type or an H type through an ion-exchange, by treating same with an ammonium salt, a mineral acid, or the like.

The zeolite usable in the present invention essentially must contain nickel. Although the nickel content is not particularly limited, it is preferably from 0.6 to 3.0 molar times the $Al_2O_3$ molar number in the zeolite, more preferably from 0.9 to 2.6 molar times. When the nickel content is less than 0.6 molar times, a catalyst having a high durability sometimes cannot be obtained, and when it is more than 3.0 molar times, a catalyst having a high activity proportional to the nickel content cannot be obtained.

Furthermore, the zeolite usable in the present invention may contain a rare earth metal or an alkaline earth metal besides nickel. Preferably, in this case, the nickel content, the content of the rare earth metal and the content of the alkaline earth metal are from 0.5 to 1.7 times, 0.1 to 0.8 times, and 0.1 to 1 time the alumina content, in terms of the molar ratio in the zeolite, respectively, and the sum of the contents of the nickel and the rare earth metal or the alkaline earth metal is from 1.0 to 2.5 times. When the nickel content is less than 0.5 times, the catalyst may be unsuitable for use as a catalyst, and when greater than 1.7 times, the durability and activity thereof proportional to such a nickel content cannot be easily obtained. When the content of the rare earth metal or the alkaline earth metal is less than the lower limit described above, an improved durability and catalytic activity might not be obtained, and when higher than the upper limit described above, an effect corresponding to the amount of addition cannot be easily obtained.

The methods of causing the zeolite to contain nickel, the rare earth metal and the alkaline earth metal are not particularly limited; an ion-exchange, impregnation and support can be used, but the ion-exchange is preferred.

As long as they are water-soluble, any salts can be used as the salts for the ion-exchange of nickel, and examples of such salts include nitrates, chlorides, acetates and sulfates. Preferably divalent acetates are used. The number of exchanges made by the ion-exchange is not particularly limited, as long as the exchange ratio is high. When the exchange ratio is low, the ion exchange may be repeated more than twice. The upper limit of the number of ion exchanges is not particularly limited, but is generally from two to five times.

The ion-exchange method may be a usual ion-exchange method, such as a method which charges a nickel salt into a slurry of the zeolite and the mixture or a method using stirring, to thereby charge the zeolite into an aqueous solution of the nickel salt. More specifically, the liquid temperature is from 20° to 100° C., preferably from 40° to 90° C., and the concentration of the nickel salt in the aqueous solution is from 0.01 to 1 mol/l, preferably from 0.1 to 1 mol/l. When the nickel concentration is less than 0.01 mol/l, the operability will become poor because a large amount of an aqueous solution is necessary. Even if the nickel concentration exceeds 1 mol/l, the ion-exchange ratio is not improved to an extent corresponding to the quantity of the reagent charged. The solid-liquid ratio of the zeolite and the aqueous solution is not particularly limited, as long as it can be sufficiently stirred, and the solid content concentration of the slurry is preferably from 5 to 50%.

The ion-exchange time is not particularly limited, and may be at least five hours per time, preferably at least ten hours per time. When the time is shorter than the value described above, the ion-exchange ratio will drop to some extent.

The salts used for the ion-exchange of the rare earth metal may be those which are water-soluble, and preferably are nitrates and chlorides having a high solubility. The kind of rare earth metal is not particularly limited, but preferably La, Ce, Y and Nd are used.

Conventional ion-exchange methods can be used for the ion-exchange of the rare earth metal, and for example, a method in the salts of the rare earth metal are charged into the slurry of the zeolite and the mixture is stirred, or a method which charges the zeolite into the aqueous solution of the rare earth metal, can be used. More specifically, the liquid temperature is from 20° to 100° C., preferably from 40° to 90° C., and the concentration of the rare earth metal salt in the aqueous solution is from 0.01 to 5 mol/l, preferably from 0.1 to 2 mol/l. The solid-liquid ratio of the zeolite and the aqueous solution is not particularly limited, as long as it can be sufficiently stirred. The solid content concentration of the slurry is preferably from 5 to 50%.

As long as they are water-soluble, any salts can be used as the salts for the ion-exchange of the alkaline earth metal, but preferably nitrates or chlorides having a high solubility are used. Although Be, Mg, Ca, Sr, Ba and Ra can be used as the alkaline earth metal, preferably Sr or Ba is used.

The ion-exchange of the alkaline earth metal may be carried out in the same way as that of the rare earth metal.

After the ion-exchange is carried out, the sample is subjected to solid-liquid separation, washing and drying, and thereafter, is used as the catalyst. If necessary, it is used as the catalyst after baking.

The rare earth metal, the alkaline earth metal and nickel can be used after they are subjected by evaporation to dryness or the like. A usual method can be employed for the evaporation to dryness. For example, a method which charges the zeolite into an aqueous solution containing the rare earth metal or nickel, and evaporates water as the solvent by a dryer or the like, can be used. The concentrations of the rare earth metal or alkaline earth metal and nickel in the aqueous solution are not particularly limited, as long as the rare earth metal or alkali earth metal or nickel is uniformly deposited; the concentration of each is generally from 0.01 to 1 mol/l.

The sequence of containing the rare earth metal or the alkaline earth metal and nickel is not particularly limited, and when contained by the ion-exchange treatment, the sequence whereby first the rare earth metal or the alkaline earth metal is contained and then the nickel, is preferred. The ion-exchange treatment may be carried out simultaneously in the co-presence of the nickel ions and the rare earth metal ions or the alkaline earth metal ions.

The silica/alumina molar ratio of the exhaust gas purifying catalyst is not substantially different from the silica/alumina molar ratio of the zeolite base used, and further, the crystal structure of the exhaust gas purifying catalyst does not substantially change before and after the ion-exchange treatment.

The catalyst according to the present invention can be used after mixing with a binder such as a clay mineral, and then molding. Alternatively, the zeolite can be premolded and then nickel contained in the zeolite molded article by the ion-exchange treatment. The binder used when molding this zeolite is a clay mineral such as kaolin, attapulgite, montmorillonite, bentonite, allophane, sepiolite, etc., and a metal oxide such as silica, alumina, silica-alumina, and so forth. Alternatively, the raw zeolite may be a binderless zeolite molded article obtained by directly synthesizing a molded article without using the binder. Furthermore, the zeolite may be obtained by wash-coating the zeolite on a honeycomb base made of cordierite or a metal.

The catalyst for purifying an exhaust gas in present invention can be used at 100°–900° C. and at gas hourly space velocity (GHSV) from 100 to 500,000 $hr^{-1}$.

The nitrogen oxides, carbon monoxide and hydrocarbons contained in the oxygen-rich exhaust gas can be removed by bringing the catalyst according to the present invention into contact with the oxygen-rich exhaust gas containing the nitrogen oxides, carbon monoxide and hydrocarbons. The term "oxygen-rich" exhaust gas to which the present invention is directed means an exhaust gas which contains oxygen in excess of the amount of oxygen necessary for completely oxidizing carbon monoxide, hydrocarbons and hydrogen contained in the exhaust gas, and examples of such an exhaust gas include the exhaust gas emitted from an internal combustion engine of an automobile, particularly under the state where an air-fuel ratio is high (i.e., a "lean range").

The performance of the exhaust gas purifying catalyst described above is not changed when applied to an exhaust gas which contains carbon monoxide, hydrocarbons and hydrogen, but is not oxygen-rich.

EXAMPLES

The present invention will now be further illustrated by, but is by no means limited to, the following Examples.

Example 1

Preparation of Catalyst 1

First, 20 g of $NH_4^+$ exchanged ZSM-5 having an $SiO_2/Al_2O_3$ molar ratio of 40 was charged into 180 g of an aqueous solution of nickel (II) acetate tetrahydrate having a concentration of 0.23 mol/l, and the mixture was stirred at 80° C. for 16 hours. After the slurry was subjected to a solid-liquid separation, the resulting zeolite cake was charged into a newly-prepared aqueous solution having the same composition as described above and similar operations were carried out. After the solid-liquid separation, the resulting product was washed with distilled water, dried at 110° C. for 10 hours, and used as the Catalyst 1. When this catalyst was examined by chemical analysis, the nickel content was found to be 1.40 times, as divalent nickel, with respect to the $Al_2O_3$ molar number of the zeolite.

Example 2

Preparation of Catalyst 2

The ion-exchange treatment was carried out eight times in the same way as in Example 1. The product was used as the Catalyst 2, and the nickel content was found to be 2.01 times, as divalent nickel, with respect to the $Al_2O_3$ molar number of the zeolite.

Example 3

Preparation of Catalyst 3

First, 20 g of $NH_4^+$ exchanged ZSM-5 having an $SiO_2/Al_2O_3$ molar ratio of 40 was charged into an aqueous solution of nickel (II) nitrate hexahydrate having a concentration of 0.1 mol/l and containing nickel in the amount corresponding to 3% of the zeolite weight, when calculated as metal nickel. The mixture was dried at 85° C. for 10 hours and then at 110° C. for 10 hours, for an evaporation to dryness. The nickel content in this zeolite was found to be 1.25 times, as divalent nickel, with respect to the $Al_2O_3$ molar number. The resulting nickel-containing zeolite was used as the Catalyst 3.

Example 4

Preparation of Catalyst 4

First, 20 g of $NH_4^+$ exchanged ZSM-5 having an $SiO_2/Al_2O_3$ molar ratio of 40 was charged into an aqueous solution of nickel (II) nitrate hexahydrate having a concentration of 0.1 mol/l and containing nickel in the amount corresponding to 6% of the zeolite weight, when calculated as metal nickel. The evaporation to dryness was effected at a reduced pressure and a liquid temperature of 80° C. The nickel content in this zeolite was found to be 2.56 times, as divalent nickel, with respect to the $Al_2O_3$ molar number. The resulting nickel-containing zeolite was used as the Catalyst 4.

Example 5

Preparation of Catalyst 5

The ion-exchange treatment was carried out only once, in the same way as in Example 1, and the nickel content in this zeolite was found to be 0.68 times, as divalent nickel, with respect to the $Al_2O_3$ molar number. The resulting nickel-containing zeolite was used as the Catalyst 6.

Example 6

Preparation of Catalyst 6

The evaporation to dryness was effected in the same way as in Example 4, except that the nickel content corresponded to 7% of the zeolite weight, when calculated as metal nickel. The nickel content in this zeolite was found to be 2.98 times, as divalent nickel, with respect to the $Al_2O_3$ molar number. The resulting nickel-containing zeolite was used as the Catalyst 6.

Comparative Example 1

Preparation of Comparative Catalyst 1

First, 20 g of $NH_4^+$ exchanged ZSM-5 having an $SiO_2/Al_2O_3$ molar ratio of 40 was charged into an aqueous solution of copper (II) acetate having a concentration of 0.1 mol/l and weighted to be two times the $Al_2O_3$ molar number contained in the ZSM-5. Immediately thereafter, the pH of the aqueous solution was adjusted to 10.5 by adding 2.5% aqueous ammonia, and the mixture was stirred at room temperature for 16 hours. After the solid-liquid separation, the product was washed with distilled water, dried at 110° C. for 10 hours, and used as the Comparative Catalyst 1. When the copper content of this catalyst was examined by chemical analysis, it was found to be 1.04 times, as divalent copper, with respect to the $Al_2O_3$ molar number of the zeolite.

Example 7

Preparation of Catalyst 7

First, 20 g of $NH_4^+$ exchanged ZDM-5 having an $SiO_2/Al_2O_3$ molar ratio of 40 was charged into 180 g of an aqueous solution of lanthanum chloride having a concentration of 1.08 mol/l, and the mixture was stirred at 80° C. for 16 hours. After the solid-liquid separation, the product was washed with distilled water and subsequently charged into 180 g of an aqueous solution of nickel (II) acetate tetrahydrate having a concentration of 0.23 mol/l. The mixture was stirred at 80° C. for 16 hours, and after the slurry was subjected to solid-liquid separation, the resulting zeolite cake was charged again into the aqueous nickel solution having the same composition as described above, which was prepared again, and the same operations were carried out. After the solid-liquid separation, the product was washed with distilled water, dried at 100° C. for 10 hours, and used as the Catalyst 7. When the lanthanum and nickel contents of this catalyst were examined by chemical analysis, it was found that the lanthanum content was 0.33 times, and the nickel content was 1.25 times, as divalent nickel, the $Al_2O_3$ molar number of the zeolite.

Example 8

Preparation of Catalyst 8

The ion-exchange treatment was carried out in the same way as in Example 7, except that the rare earth metal used was cerium. This catalyst was used as the Catalyst 8. When the cerium and nickel contents of this catalyst were examined by chemical analysis, it was found that the cerium content was 0.13 times and the nickel content was 1.18 times, as divalent nickel, the $Al_2O_3$ molar number of the zeolite.

Example 9

Preparation of Catalyst 9

The ion-exchange treatment was carried out in the same way as in Example 7, except that the rare earth metal used was yttrium. This catalyst was used as the Catalyst 9. When the yttrium and nickel contents of this catalyst were examined by chemical analysis, it was found that yttrium content was 0.12 times and the nickel content was 1.08 times, as divalent nickel, the $Al_2O_3$ molar number of the zeolite.

Example 10

Preparation of Catalyst 10

The ion-exchange treatment was carried out in the same way as in Example 7, except that the rare earth metal used was neodymium. This catalyst was used as the Catalyst 10. When the neodymium and nickel contents of this catalyst were examined by chemical analysis, it was found that the neodymium content was 0.11 times and the nickel content was 1.04 times, as divalent nickel, the $Al_2O_3$ molar number of the zeolite.

Example 11

Preparation of Catalyst 11

First, 20 g of $NH_4^+$ exchanged ZSM-5 having an $SiO_2/Al_2O_3$ molar ratio of 40 was charged into 180 g of an aqueous solution of nickel (II) acetate tetrahydrate having a concentration of 0.23 mol/l, and the mixture was stirred at 80° C. for 16 hours. After the slurry was subjected to solid-liquid separation, the resulting zeolite cake was charged into the aqueous solution having the same composition as described above, which was again prepared, and similar operations were carried out. After the solid-liquid separation, the product was washed with distilled water, subsequently charged into 180 g of an aqueous solution of lanthanum chloride having a concentration of 1.09 mol/l, and stirred at 80° C. for 16 hours. After the solid-liquid separation, the product was washed with distilled water and dried at 110° C. for 10 hours. This catalyst was used as the Catalyst 11. When the lanthanum and nickel contents of this catalyst were examined by chemical analysis, it was found that the lanthanum content was 0.44 times and the nickel content was 1.18 times, as divalent nickel, the $Al_2O_3$ molar number of the zeolite.

Example 12

Preparation of Catalyst 12

First, 20 g of $NH_4^+$ exchanged ZSM-5 having an $SiO_2/Al_2O_3$ molar ratio of 40 was charged into 180 g of an aqueous solution of nickel (II acetate tetrahydrate having a concentration of 0.23 mol/l, and the mixture was stirred at 80° C. for 16 hours. After the slurry was subjected to the solid-liquid separation, the resulting zeolite cake was charged into the aqueous solution having the same composition as described above, which was prepared again, and similar operations were carried out. After the solid-liquid separation, the product was washed with distilled water and dried at 100° C. for 10 hours. When the nickel content of this zeolite was examined by chemical analysis, it was found that the nickel content was 1.41 times, as divalent nickel, the $Al_2O_3$ molar number of the zeolite. Furthermore, 20 g of this zeolite was charged into 29 ml of a 0.05 mol/l aqueous lanthanum nitrate solution containing lanthanum, in an amount corresponding to 1 wt % as metal lanthanum, and was dried at 85° C. for 10 hours, and subsequently at 110° C. for 10 hours, for an evaporation to dryness. The resulting catalyst was used as the Catalyst 12.

Comparative Example 2

Preparation of Comparative Catalyst 2

First, 20 g of $NH_4^+$ exchanged ZSM-5 having an $SiO_2/Al_2O_3$ molar ratio of 40 W charged into 180 g of an aqueous solution of lanthanum chloride having a concentration of 1.08 mol/l, and the mixture was stirred at 80° C. for 16 hours. After the solid-liquid separation, the product was dried at 100° C. for 10 hours and was used as the Comparative Catalyst 2. When this catalyst was examined by chemical analysis, it was found that the lanthanum content was 0.55 times the $Al_2O_3$ molar number of the zeolite.

Example 13

Preparation of Catalyst 13

First, 20 g of $NH_4^+$ exchanged ZSM-5 having an $SiO_2/Al_2O_3$ molar ratio of 40 was charged into 180 g of an aqueous solution of barium chloride having a concentration of 1.09 mol/l, and the mixture was stirred at 80° C. for 16 hours. After the solid-liquid separation, the product was washed with distilled water, and subsequently, charged into 180 g of an aqueous solution of nickel (II) acetate tetrahydrate having a concentration of 0.23 mol/l and stirred at 80° C. for 16 hours.

After the slurry was subjected to the solid-liquid separation treatment, the resulting zeolite cake was charged into the aqueous nickel solution having the composition described above, which was again prepared, and similar operations were carried out. After the solid-liquid separation, the product was washed with distilled water, dried at 110° C. for 10 hours and was used as the Catalyst 13. When the barium and nickel contents of this catalyst were examined by chemical analysis, it was found that the barium content was 0.47 times and the nickel content was 1.25 times, as divalent nickel, the $Al_2O_3$ molar number of the zeolite.

Example 14

Preparation of Catalyst 14

The ion-exchange treatment was carried out in the same way as in Example 13, except that the alkaline earth metal used was strontium. The catalyst was used as the Catalyst 14. When the strontium and nickel contents of this catalyst were examined by chemical analysis, it was found that the strontium content was 0.25 times and the nickel content was 1.18 times, as divalent nickel, the $Al_2O_3$ molar number of the zeolite.

Example 15

Preparation of Catalyst 15

The ion-exchange treatment was carried out in the same way as in Example 13, except that the alkaline earth metal used was magnesium. The catalyst was used as the Catalyst 15. When the magnesium and nickel contents of this catalyst were examined by chemical analysis, it was found that the magnesium content was 0.16 times and the nickel content was 1.08 times, as divalent nickel, the $Al_2O_3$ molar number of the zeolite.

Example 16

Preparation of Catalyst 16

The ion-exchange treatment was carried out in the same way as in Example 13 except that the alkaline earth metal used was calcium. The catalyst was used as the Catalyst 16. When the calcium and nickel contents of this catalyst were examined by chemical analysis, it was found that the calcium content was 0.14 times and the nickel content was 1.04 times, as divalent nickel, the $Al_2O_3$ molar number of the zeolite.

Example 17

Preparation of Catalyst 17

First, 20 g of $NH_4^+$ exchanged ZSM-5 having an $SiO_2$/$Al_2O_3$ molar ratio of 40 was charged into 180 g of an aqueous solution of nickel (II) acetate tetrahydrate having a concentration of 0.23 mol/l, and the mixture was stirred at 80° C. for 16 hours. After the slurry was subjected to solid-liquid separation, the resulting zeolite cake was charged into the aqueous solution having the composition described above, which was again prepared, and similar operations were carried out. After the solid-liquid separation, the product was washed with distilled water, and subsequently, charged into 180 g of an aqueous solution of barium chloride having a concentration of 1.09 mole/l and stirred at 80° C. for 16 hours. After the solid-liquid separation, the product was distilled washed with distilled water, dried at 110° C. for 10 hours, and used as the Catalyst 17. When the barium and nickel contents of this catalyst were examined by chemical analysis, it was found that the barium content was 0.62 times and the nickel content was 1.18 times, as divalent nickel, the $Al_2O_3$ molar number of the zeolite.

Example 18

Preparation of Catalyst 18

First, 20 g of $NH_4^+$ exchanged ZSM-5 having an $SiO_2$/$Al_2O_3$ molar ratio of 40 was charged into 180 g of an aqueous solution of nickel (II) acetate tetrahydrate having a concentration of 0.23 mol/l, and the mixture was stirred at 80° C. for 16 hours. After the slurry was subjected to solid-liquid separation, the resulting zeolite cake was charged into the aqueous solution having the composition described above, which was again prepared, and similar operations were carried out. After the solid-liquid separation, the product was washed with distilled water and dried at 110° C. for 10 hours. When this zeolite was examined by chemical analysis, it was found that the nickel content was 1.41 times, as divalent nickel, the $Al_2O_3$ molar number of the zeolite. Furthermore, 20 g of this zeolite was charged into 29 ml of an aqueous solution of barium nitrate having a concentration of 0.05 mol/l and containing barium in the amount corresponding to 1 wt % as metal barium, and the product was dried at 85° C. for 10 hours, and subsequently, at 110° C. for 10 hours, for an evaporation to dryness. This catalyst was used as the Catalyst 18.

Comparative Example 3

Preparation of Comparative Catalyst 3

First, 20 g of $NH_4^+$ exchanged ZSM-5 having an $SiO_2$/$Al_2O_3$ molar ratio of 40 was charged into 180 g of an aqueous solution of barium chloride having a concentration of 1.09 mol/l, and the mixture was stirred at 80° C. for 16 hours. After the solid-liquid separation, the product was sufficiently washed, dried at 110° C. for 10 hours and used as the comparative Catalyst 3. When this catalyst was examined by chemical analysis, it was found that the barium content was 0.76 times the $Al_2O_3$ molar number of the zeolite.

Example 19

Evaluation of Catalyst Activity

After each of the Catalysts 1 to 18 prepared in Examples 1 to 18 was press-molded, the molded article was pulverized and classified to 12 to 20 mesh, and 0.65 g of the pulverizate was packed into an atmospheric pressure fixed bed flow type reactor (i.e., reaction tube). A gas having the following composition (hereinafter referred to as the "reaction gas") was passed through the reactor at flow rate of 600 ml/min (30,000 $hr^{-1}$ of GHSV (gas hourly space velocity)), and a pre-treatment was carried out by raising the temperature to 500° C. and keeping the reactor at that temperature for 0.5 hours. Thereafter, the temperature was lowered to 200° C. and then raised to 800° C. at a rate of 5° C./min, to measure a NO purification efficiency (Reaction 1). Subsequently, the temperature was kept at 800° C. for 5 hours, and after the flowing gas was changed to nitrogen, the reactor was allowed to cool. After the reactor was cooled to room temperature, the flowing gas was changed to the reaction gas, and a pre-treatment was carried out by raising the temperature to 200° C. and keeping it at that temperature for 0.5 hours. Thereafter, the temperature was raised to 800° C. at a rate of 5° C./min, to measure a NO purification efficiency (Reaction 2). Table 1 shows the results of an evaluation of the durability of each catalyst, in terms of the change of the maximum purification efficiency in the Reactions 1 and 2, using NO, i.e., nitrogen oxides, as the detrimental components in the reaction gas. The smaller the drop of the maximum purification efficiency in the Reactions 1 and 2, or i.e., the higher the NO purification efficiency in the Reaction 2, the higher the heat-resistance and durability of the catalyst. The NO purification efficiency is expressed by the following formula:

$$\text{NO purification efficiency (\%)}=[(NO_{in}-NO_{out})/NO_{in}]\times 100$$

$NO_{in}$: NO concentration at inlet of fixed bed type reactor,
$NO_{out}$: NO concentration at outlet of fixed bed type reactor,
Reaction gas composition:
NO: 700 ppm
$O_2$: 4%
CO: 1,000 ppm
$C_3H_6$: 400 ppm
$H_2O$: 3%
$N_2$: balance Comparative Example 4

Activity Evaluation of Comparative Catalysts

The activity of the Comparative Catalysts 1 to 3 obtained in Comparative Examples 1 to 3 was evaluated in the same way as in Example 19, and the results are shown in Table 1.

TABLE 1

| Catalyst | Maximum purification efficiency (%) in Reaction 1 | Maximum purification efficiency (%) in Reaction 2 |
|---|---|---|
| Present catalyst 1 | 60 | 47 |
| Present catalyst 2 | 58 | 43 |
| Present catalyst 3 | 62 | 39 |
| Present catalyst 4 | 78 | 39 |

TABLE 1-continued

| Catalyst | Maximum purification efficiency (%) in Reaction 1 | Maximum purification efficiency (%) in Reaction 2 |
|---|---|---|
| Present catalyst 5 | 51 | 33 |
| Present catalyst 6 | 60 | 36 |
| Present catalyst 7 | 77 | 61 |
| Present catalyst 8 | 72 | 58 |
| Present catalyst 9 | 60 | 48 |
| Present catalyst 10 | 60 | 50 |
| Present catalyst 11 | 67 | 54 |
| Present catalyst 12 | 71 | 58 |
| Present catalyst 13 | 79 | 62 |
| Present catalyst 14 | 75 | 60 |
| Present catalyst 15 | 65 | 52 |
| Present catalyst 16 | 68 | 51 |
| Present catalyst 17 | 63 | 57 |
| Present catalyst 18 | 65 | 57 |
| Com. catalyst 1 | 98 | 30 |
| Com. catalyst 2 | 39 | 24 |
| Com. catalyst 3 | 45 | 23 |

It can be understood from Table 1 that the catalyst of the present invention has a higher catalytic activity at the initial stage, and after held at 800° C. for 5 hours in the reaction gas, and a higher exhaust gas purification capacity than the Comparative Catalysts, and exhibits a very high heat-resistance and durability. Accordingly, the present invention provides effects such that a purification of nitrogen oxides, carbon monoxide and hydrocarbons can be achieved by bringing the catalyst of the present invention into contact with the exhaust gas, even in an oxygen-rich state.

We claim:

1. A method of reducing nitrogen oxides by hydrocarbons from an oxygen-rich combustion exhaust gas, comprising bringing an exhaust gas containing the nitrogen oxides, hydrocarbons and oxygen, into contact with a catalyst comprising a nickel- and rare earth metal-ion-exchanged zeolite, said zeolite having an $SIO_2/Al_2O_3$ molar ratio of at least 15.

2. A method as claimed in claim 1, wherein an $SiO_2/Al_2O_3$ molar ratio is in the range of 15 to 1000.

3. A method as claimed in claim 1, wherein the nickel content is from 0.5 to 1.7 in terms of a molar ratio of $Ni/Al_2P_3$.

4. A method as claimed in claim 1, wherein the content of the earth metal is 0.1 to 0.8 in terms of a molar ratio of a rare earth metal/$Al_2O_3$.

5. A method as claimed in claim 1, wherein the total content of nickel and rare earth metal is 1.0 to 2.5 in terms of a molar ratio of (Ni+rare earth metal)/$Al_2O_3$.

6. A method as claimed in claim 1, wherein the rare earth metal is at least one member selected from the group consisting of La, Ce, Y and Nd.

7. A method as claimed in claim 1, wherein the operation temperature of the catalyst is in the range 200° to 800° C.

8. A method of reducing nitrogen oxides by hydrocarbons from an oxygen-rich combustion exhaust gas, comprising bringing an exhaust gas containing the nitrogen oxides, hydrocarbons and oxygen, into contact with a catalyst comprising a nickel- and alkaline earth metal-ion-exchanged zeolite, said zeolite having an $SiO_2/Al_2O_3$ molar ratio of at least 15.

9. A method as claimed in claim 8, wherein an $SiO_2/Al_2O_3$ molar ratio is in the range of 15 to 1000.

10. A method as claimed in claim 8, wherein the nickel content is from 0.5 to 1.7 in terms of a molar ratio of $Ni/Al_2O_3$.

11. A method as claim in claim 8, wherein the content of the alkaline earth metal is from 0.1 to 1.0 in terms of a molar ratio of an alkaline earth metal $Ni/Al_2O_3$.

12. A method as claimed in claim 8, wherein the total content of nickel and alkaline earth metal is 1.0 to 2.5 in terms of a molar ratio of (Ni+alkaline earth metal)/$Al_2O_3$.

13. A method as claimed in claim 8, wherein the alkaline earth metal is at least one member selected from the group consisting of Be, Mg, Ca, Sr, Ba and Ra.

14. A method as claimed in claim 8, wherein the operation temperature of the catalyst is in the range of 200° to 800° C.

* * * * *